United States Patent Office 3,694,144
Patented Sept. 26, 1972

3,694,144
CORROSION INHIBITOR OF DIHYDRO-AROMATIC
NITROGEN-HETEROCYCLIC PHOSPHONATES
Derek Redmore, Ballwin, Mo., assignor to Petrolite
Corporation, Wilmington, Del.
No Drawing. Original application May 31, 1968, Ser.
No. 733,328. Divided and this application Jan. 18, 1971,
Ser. No. 107,557
Int. Cl. C23f 11/16, 11/00
U.S. Cl. 21—2.7                 5 Claims

ABSTRACT OF THE DISCLOSURE

Nitrogen-heterocyclic phosphonates wherein the phosphonate group is otho- or para- to the nitrogen heterocyclic group, where the compounds are characterized as follows:

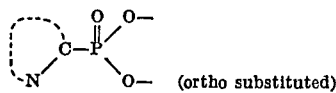
(ortho substituted)

and

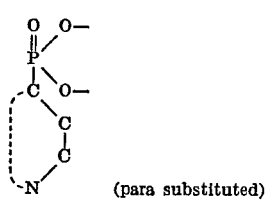
(para substituted)

wherein the dotted line represents a cyclic structure which cyclic structure may be the sole cyclic structure, or may be attached to other cyclic groups.

These nitrogen heterocyclic phosphonates are prepared by reacting an aromatic nitrogen heterocyclic compound, wherein the nitrogen atom is in the form of a salt or a quaternary, with a phosphite salt, preferably in the form of esters of the phosphite as exemplified by the following equation:

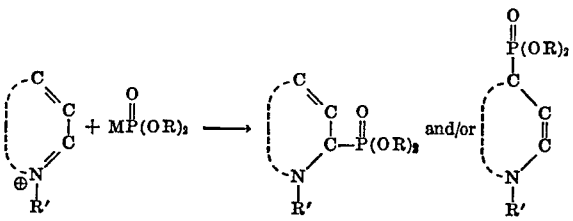

These compounds which may be characterized as phosphonates of dihydroaromatic nitrogen heterocycles have many uses including their use as biocides such as bactericides, herbicides, corrosion inhibitors, chelating agents, etc.

---

This application is a division of S.N. 733,328 filed May 31, 1968.

This invention relates to nitrogen-heterocyclic phosphonates. More particularly this invention relates to nitrogen-heterocyclic phosphonates wherein the phosphonate group is ortho or para to the heterocyclic nitrogen group. Still more particularly, this invention relates to compounds characterized by the following groups:

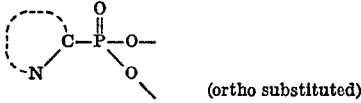
(ortho substituted)

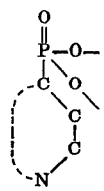
(para substituted)

wherein the dotted lines indicate a cyclic structure, which cyclic structure may be the sole cyclic structure or may be attached to other cyclic groups. These compounds may be characterized as phosphonates of dihydroaromatic nitrogen heterocyclics.

This invention also relates to the preparation of these phosphonates which comprises reacting an aromatic nitrogen heterocyclic, wherein the nitrogen atom is in the form of a salt or quaternary, with a phosphite salt, preferably in the form of esters of the phosphite, as exemplified by the following equation:

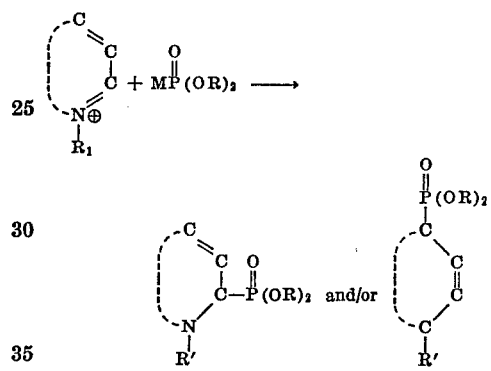

This invention also relates to uses for these compounds for example as biocides such as bacteriocides, herbicides, corrosion inhibitors, chelating agents, etc.

Any nitrogen heterocyclic having an available ortho and/or para position capable of being activated by salt or quaternary formation of the nitrogen group so as to promote reaction with salts of phosphite esters can be employed. This includes heterocyclics having one or more rings, where at least one ring has a nitrogen heterocyclic group and the other rings are carbocyclic or heterocyclic, i.e., they may contain oxygen or other non-carbon elements in the ring, etc.

This may be illustrated by the following equations:

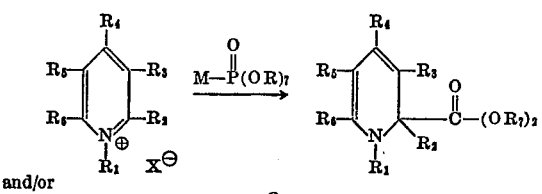

and/or

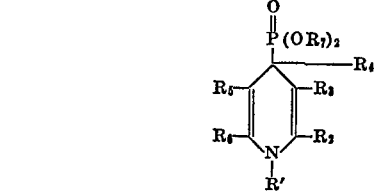

$R_1$, $R_2$, $R_3$, $R_4$, $R_5$, $R_6$ may be hydrogen or a substituted group, for example, alkyl, cycloalkyl, aryl, alkaryl, aralkyl, etc.

$R_7$ is an ester moiety for example alkyl, aryl, cycloalkyl, aralkyl, alkaryl, etc. oxyalkylated groups, etc.

The groups of $R_1$ to $R_7$ may also be further substituted provided the substituted groups do not interfere with the reaction.

Any of the $R_2$ to $R_6$ groups may also be joined to an adjacent group so as to form a ring provided ortho and/or para positions are available for substitution, for example in the following aromatic type ring systems:

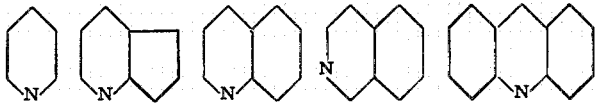

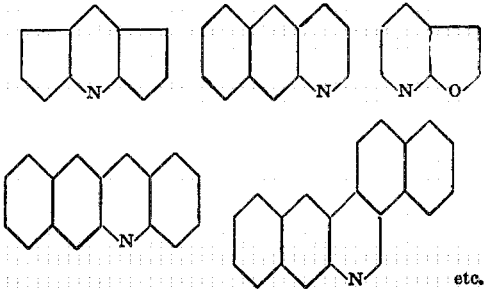

The above ring systems may also be substituted. The adjacent rings may also contain heterocyclic groups for example oxygen, nitrogen, etc., and/or may contain rings having less than six molecules in the ring for example a 5 member ring.

In certain instances more than one nitrogen heterocyclic ring may be capable of reacting with the phosphite salt so that phosphonate substitution may occur in more than one ring.

X is any suitable anion, for example halogen, e.g. chlorine, bromine, iodine, etc., —$SO_4R$, —$SO_3R$ where R is alkyl such as

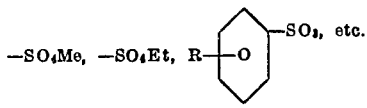

Representative examples of heterocyclic reactants include pyridines and benzo- and dibenzo- derivatives of pyridine, for example, pyridine, alkylated pyridines such as 2-picoline, 3-picoline, 4-picoline, etc., 2,4-lutidine, 2,6-lutidine, 2,3-lutidine, etc., collidines, etc. quinoline and alkylated quinolines, etc. isoquinolines, and alkylated isoquinolines, etc. phenanthradines, and substituted phenanthridines, etc., acridines and substituted acridines, etc.

The nitrogen group in the heterocyclic ring is reacted with an acid or a quaternizing agent to activate the ring.

The phosphorus-containing reactant is a metal salt of phosphorus acid, preferably in the form of an alkali metal salt in which the metal is directly bonded to phosphorus. In order to prevent undesirable side reactions the phorphorus acid is used in the form of a derivative preferably as a diester.

Where the phosphite ester contains more than one phosphite unit, a plurality of heterocyclic units may be joined thereto, for example

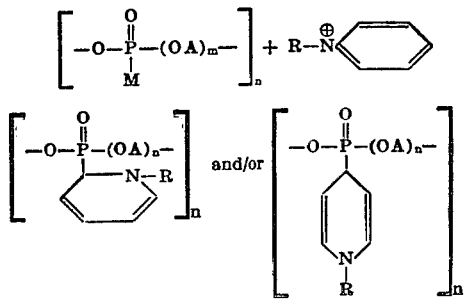

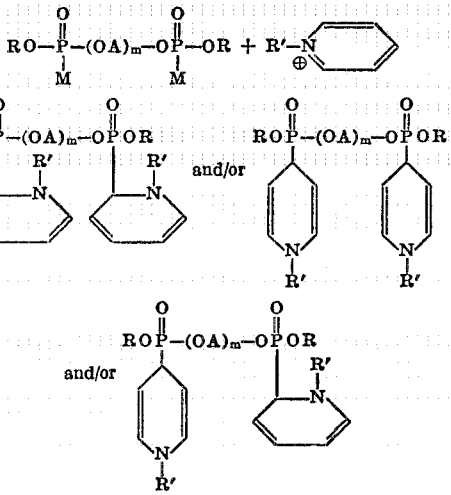

In general, the reaction is carried out in an inert solvent which is water free at a temperature and time sufficient to promote the desired reaction. Ether solvents such as diethyl ether, dioxane and tetrahydrofuran are useful as well as aromatic hydrocarbon solvent like benzene, toluene, etc. Particularly useful are dipolar aprotic solvents such as dimethyl sulfoxide, dimethyl formamide N-methyl pyrrolidone. Combinations of these various types of solvents can also be advantageously used. Temperature and time are interrelated. Thus, a temperature of from 30° to the decomposition temperature of reactants and products can be employed, the upper limit of temperature being generally about 150° C., for a time of from 0.5–10 hours but preferably 1–3 hours. The inorganic salt is separated from the organic layer by filtration or by water extraction and the phosphonate derivative is separated from the organic layer. In addition the reaction is best carried out on an inert atmosphere such as nitrogen, argon, etc. In this way the attack of oxygen on phosphite salts and on the products is prevented.

The following examples are presented by way of illustration and not of limitation.

EXAMPLE 1

Preparation of diethyl 10-methyl-9,10-dihydro acridine-9-phosphonate

Acridine (50 g.) was reacted with dimethyl sulfate (35.2 g.) in benzene to form N-methyl acridinium methosulfate. Diethyl phosphite (38.6 g.) was dissolved in benzene and reacted with sodium (6.45 g.) under a nitrogen atmosphere. The sodio derivative of the diethyl phosphite is added to a stirred suspension of the acridinium quaternary during 15 minutes. A mildly exothermic reaction occurred. After heating at 90° C. for two hours the mixture was cooled to room temperature and water (100 ml.) was added. The organic layer was separated and by evaporation of the solvent the crude product was obtained. The crude product was crystallized from benzene/hexane solvent to give the pure product M.P. 89–91° (70% yield) Analysis gave (percent): N, 4.25; P, 9.32 Calculated values (percent): N, 4.23; P, 9.35. The infrared spectrum showed absorption at 8.0μ (P=O). The product is represented by the formula

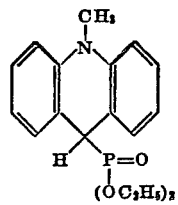

EXAMPLE 2

Preparation of diethyl 9,10-dihydro acridine-9-phosphonate

To acridine hydrobromide (26 g.) suspended in toluene (100 ml.) was added a solution of the sodio derivative of diethyl phosphite in dioxane (50 ml.) (prepared from diethyl phosphite (13.8 g.) and sodium (2.3 g.)) in 20 minutes. The reactants were heated under reflux for two hours and allowed to cool to room temperature. After the addition of water (100 ml.) the organic layer was separated and the aqueous layer extracted with chloroform. Evaporation of the combined organic extracts produced 20 g. (65%) of crude product. Recrystallization from benzene/hexane gave the pure acridine phosphonate M.P. 189–90°. The product showed infrared absorption at 3.1$\mu$ (N—H), and 8.3$\mu$ (P=O). Analysis (percent): N, 4.51; P, 9.79. Calculated for $C_{17}H_{20}NO_3P$ (percent): N, 4.42; P, 9.78.

The structure of the product is

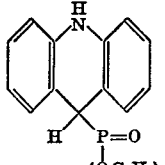

EXAMPLE 3

Preparation of diethyl 10-methyl-9,10-dihydro acridine-9-phosphonate

Acridine was converted to the quaternary N-methyl acridinium iodide by reaction with methyl iodide. This quaternary was reacted with the sodio derivative of diethyl phosphite in dioxane following the procedure of Example 1. The product obtained using the isolation procedure of Example 1 was identical with that product in all respects. Yield—55%.

EXAMPLE 4

Preparation of diisopropyl 10-methyl-9,10-dihydro-acridine-9-phosphonate

N-methyl acridinium methosulfate (from acridine (17.9 g.) and dimethyl sulfate (12.6 g.)) suspended in toluene (75 ml.) was treated with the sodio derivative of diisopropyl phosphite in dioxane (50 ml.) (prepared from diisopropyl phosphite (16.6 g.) and sodium (2.3 g.)). The reaction was brought to completion by heating at 90° for six hours. Addition of water and isolation as in Example 1 gave the acridine phosphonate (40% yield) M.P. 124–5° after crystallization from benzene-hexane. The product had the structure.

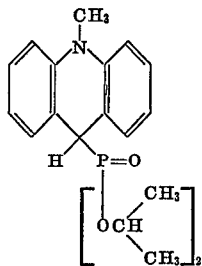

*Analysis.*—Found (percent): N, 3.85; P, 8.39. Calculated for $C_{20}H_{26}NO_3P$ (percent): N, 3.90; P, 8.64.

EXAMPLE 5

Preparation of diethyl 2-methyl 1,2-dihydro isoquinoline 1-phosphonate

N-methyl isoquinolinium iodide (94.5 g.) was suspended in benzene (200 ml.) by vigorous stirring while the sodio derivative of diethyl phosphite in dioxane (100 ml.) (from diethyl phosphite (49 g.) and sodium (8.2 g.)) was added dropwise in 20 minutes. The reaction was carried out under an argon atmosphere. After the addition the mixture was heated for one hour at 70–80° and allowed to cool to room temperature before the addition of water (200 ml.). The aqueous layer was separated and extracted with benzene (2 times with 100 ml.). Evaporation of the combined organic fractions gave the product as a dark oil 71 g. (72%).

Infrared absorption at 8.05$\mu$ (P=O), 9.8$\mu$ (P—O—C)$\tau$ are consistent with structure.

Nuclear magnetic resonance (NMR) absorption at 8.87 and 6.05$\tau$ (—OC$_2$H$_5$), 7.02$\tau$ (N—CH$_3$), 5.23$\tau$ (H at C$_1$) and 4.8$\tau$ and 3.97$\tau$ (H at C$_3$ and C$_4$).

The product contains P=10.45%. Calculated 11.0%.
The following is the structure of the product.

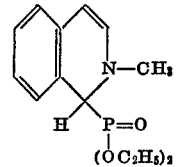

EXAMPLE 6

Preparation of diethyl 1,2-dihydroisoquinoline phosphonate

Isoquinoline hydrobromide (19 g.) was suspended in benzene (150 ml.) by vigorous stirring while the sodio derivative of diethyl phosphite in dioxane (50 ml.) (from diethyl phosphite (13.8 g.) and sodium (2.3 g.)) was added during ten minutes. The reaction was completed by heating under reflux for one hour. The product was isolated as a dark oil following the procedure of Example 5 in 75% yield. The infrared spectrum showed characteristic absorption at 8.0$\mu$ (P=O). The product is the dihydroisoquinoline phosphonate of the following formula:

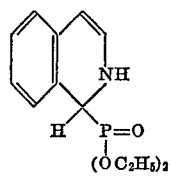

EXAMPLE 7

Preparation of diethyl 1-propyl 1,2-dihydroquinoline 2-phosphonate and diethyl 1-propyl 1,4-dihydroquinoline 4-phosphonate N-propyl quinolinium iodide (66.5 g.) was suspended in benzene by vigorous stirring while the sodio derivative of diethyl phosphite (from diethyl phosphite (30.5 g.) and sodium (5.15 g.)) in dioxane (100 ml.) was added during twenty minutes. The reaction was completed by heating at 80° for two hours. After cooling, water (200 ml.) was added and the product isolated as a dark yellow oil as in Example 5. Yield 52 g. (76%). Infrared absorption at 8.0$\mu$ (P=O) and 9.8$\mu$ (P—O—C) are in agreement with a dihydroquinoline phosphonate structure.

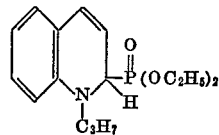

The product also contains small amounts of the 4-isomer:

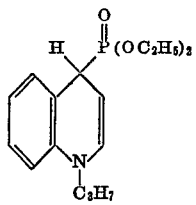

EXAMPLE 8

Preparation of diethyl 5-methyl 5,6-dihydrophenanthridine 6-phosphonate

N-methyl phenanthridinium iodide (45 g.) was suspended in toluene (150 ml.) and reacted with sodio diethyl phosphite (22.5 g.) in dioxane (100 ml.) under a nitrogen blanket. After heating for two hours at 90-100° the reaction mixture was cooled and water (200 ml.) was added. Benzene extraction gave the crude phosphonate in 80% yield. The dihydro-phenanthridine phosphonate had the following structure:

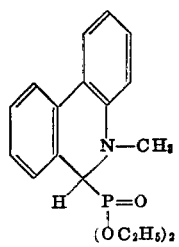

EXAMPLE 9

Preparation of diethyl 1-methyl 1,2-dihydropyridine 2-phosphonate and diethyl-1-methyl 1,4-dihydropyridine 4-phosphonate To a stirred suspension of N-methyl pyridinium methosulfate (205 g.) in toluene (250 ml.) under an argon atmosphere was added sodio diethyl phosphite (from diethyl phosphite (138 g.) and sodium (23 g.)) in dioxane (200 ml.) during 20 minutes. The reaction was brought to completion by heating at 95° for 3 hours. To the crude product was added ether (200 ml.) and solid (inorganic) was filtered off. Evaporation of the solvent under reduced pressure gave the product as a dark brown oil which was readily soluble in water and in aromatic hydrocarbons. The product is a mixture represented by the formulae:

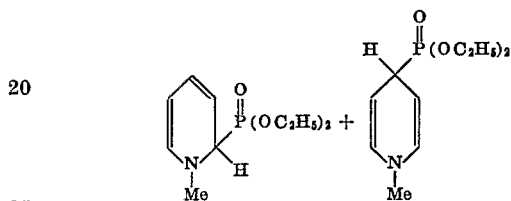

Since the above examples illustrate the general methods of preparation, additional examples are presented in the following table:

TABLE I

| Ex. | Reactants | | | Product |
|---|---|---|---|---|
| | Heterocyclic | Quaternary or salt | Phosphite | |
| 10 | 2-picoline | Methiodide | NaP(OC₂H₅)₂ ‖ O | (structure) |
| 11 | 4-picoline | Methiodide | NaP(OC₂H₅)₂ ‖ O | (structure) |
| 12 | 2,6-lutidine | N-methyl methosulfate | NaP(OC₂H₅)₂ ‖ O | (structure) |
| 13 | Acridine | N-ethyl ethosulfate | NaPOC₂H₅ ‖ O | (structure) |

As is quite evident, other nitrogen heterocyclics and phosphites are useful in my invention. It is, therefore, not only impossible to attempt a comprehensive catalogue of such compounds, but to attempt to describe the invention in its broader aspects in terms of specific heterocyclics and phosphites reacted would be too voluminous and unnecessary since one skilled in the art could by following the description of the invention herein select a useful reactant. This invention lies in the reaction of suitable heterocyclics and phosphites and their individual compositions are important only in the sense that they react to form useful products. To precisely define each specific useful heterocyclic in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific heterocyclics suitable for this invention. In analogy to the case of a machine, wherein the use of certain materials of construction or dimensions of parts would lead to no practical useful result, various materials will be rejected as inapplicable where others would be operative. I can obviously assume that no one will wish to use a useless heterocyclic nor will be misled because it is possible to misapply the teachings of the present disclosure to do so. Thus, any heterocyclic that can react as stated herein can be employed.

Corrosion tests.—The test procedure includes measurement of the corrosive action of the fluids inhibited by the compositions herein described upon sand-blasted SAE-1020 steel coupons under conditions approximating those found in an actual producing well, and the comparison thereof with results obtained by subjecting identical test coupons to the corrosive action of the identical fluids containing no inhibitor.

In the present tests clean pint bottles are charged with 440 ml. of a synthetic brine, which contains 42 g. of sodium chloride, 14 g. calcium chloride, 1 g. of sodium sulfate and 17 g. of magnesium chloride per liter, saturated with hydrogen-sulfide and a predetermined amount of inhibitor is then added. The inhibitor concentraton is based on the total volume of fluid. Bottle caps holding three coupons are then placed tightly on the bottles. The bottles are then placed on a wheel contained in an oven and rotated for 4 hours at 90–95° F. Corrosion rates are then measured using the three coupons in each bottle as electrodes in conjunction with an instrument for measurement of instantaneous corrosion rates. Percent protection is calculated from $$\frac{R_1-R_2}{R_1} \times 100\%$$

where $R_1$ is corrosion rate of uninhibited fluids
$R_2$ is corrosion rate of inhibited fluids The compositions of this invention give good corrosion protection in the above test as shown by the data in the following table.

| Compound | Concentration, p.p.m. | Protection, percent |
|---|---|---|
| Example 5 | 50 | 89 |
|  | 100 | 94 |
| Example 7 | 50 | 88 |
|  | 100 | 92 |
| Commercial inhibitor | 50 | 75 |
|  | 100 | 84 |

I claim:
1. A process of inhibiting corrosion which is characterized by treating a metal with a compound selected from the group consisting of

(I) a dihydroaromatic nitrogen phosphonate wherein the nitrogen heterocyclic group is a dihydro member selected from the group consisting of pyridine, alkylated pyridine, quinoline, alkylated quinoline, isoquinoline and alkylated isoquinoline, and the phosphonate group is ortho or para to the nitrogen atom in the heterocyclic ring of the dihydro member selected from the group consisting of pyridine, alkylated pyridine, quinoline and alkylated quinoline, and the phosphonate group is ortho to the nitrogen atom in the heterocyclic ring of the dihydro member selected from the group consisting of isoquinoline and alkylated isoquinoline.
(II) a dihydroaromatic nitrogen heterocyclic phosphonate wherein the nitrogen heterocyclic group is a dihydro member selected from the group consisting of acridine and alkylated acridine and the phosphonate group is para to the nitrogen atom in the heterocyclic ring of the dihydro member,
(III) a dihydroaromatic nitrogen heterocyclic phosphonate wherein the nitrogen heterocyclic group is a dihydro member selected from the group consisting of phenanthridine and alkylated phenanthridine and the phosphonate group is ortho to the nitrogen atom in the heterocyclic ring of the dihydro member, and
(IV) mixtures of the compounds (I)–(III).

2. The process of claim 1 wherein dihydroaromatic nitrogen phosphonate is a mixture of diethyl 1-propyl-1,2-dihydroquinoline-2-phosphonate and diethyl 1-propyl-1,4-dihydro-quinoline-4-phosphonate.

3. The process of claim 1 wherein the phosphonate group in the dihydroaromatic nitrogen phosphonate is a member selected from the group consisting of (A)

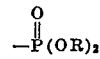

wherein R is a radical selected from the group consisting of alkyl, aryl, cycloalkyl, aralkyl and alkaryl and (B)

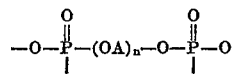

wherein OA is an oxyalkylated group and $n$ is at least 1.

4. The process of claim 3 wherein the phosphonate group in the dihydroaromatic nitrogen phosphonate is

and R is alkyl.

5. The process of claim 4 whrein dihydroaromatic nitrogen phosphonate is diethyl 2-methyl-1,2-dihydro-isoquinoline-1-phosphonate.

References Cited
UNITED STATES PATENTS

| | | | |
|---|---|---|---|
| 2,466,517 | 4/1949 | Blair et al. | 21—2.7 X |
| 3,165,513 | 1/1965 | D'Alelio | 252—389 X |
| 3,247,113 | 4/1966 | Hasserodt et al. | 252—389 X |
| 3,316,331 | 4/1967 | Sims | 252—389 X |
| 3,483,133 | 12/1969 | Hatch et al. | 252—390 X |
| 3,505,238 | 4/1970 | Liddell | 21—2.7 X |
| 3,518,203 | 6/1970 | Savinelli et al. | 21—2.7 X |
| 3,600,470 | 8/1971 | Lewis | 252—389 X |

MORRIS O. WOLK, Primary Examiner

J. T. ZATARGA, Assistant Examiner

U.S. Cl. X.R.

252—389